March 2, 1937. P. J. BRENNAN 2,072,793
METHOD OF FORMING ROLLS AND PASTRIES
Filed Nov. 21, 1935
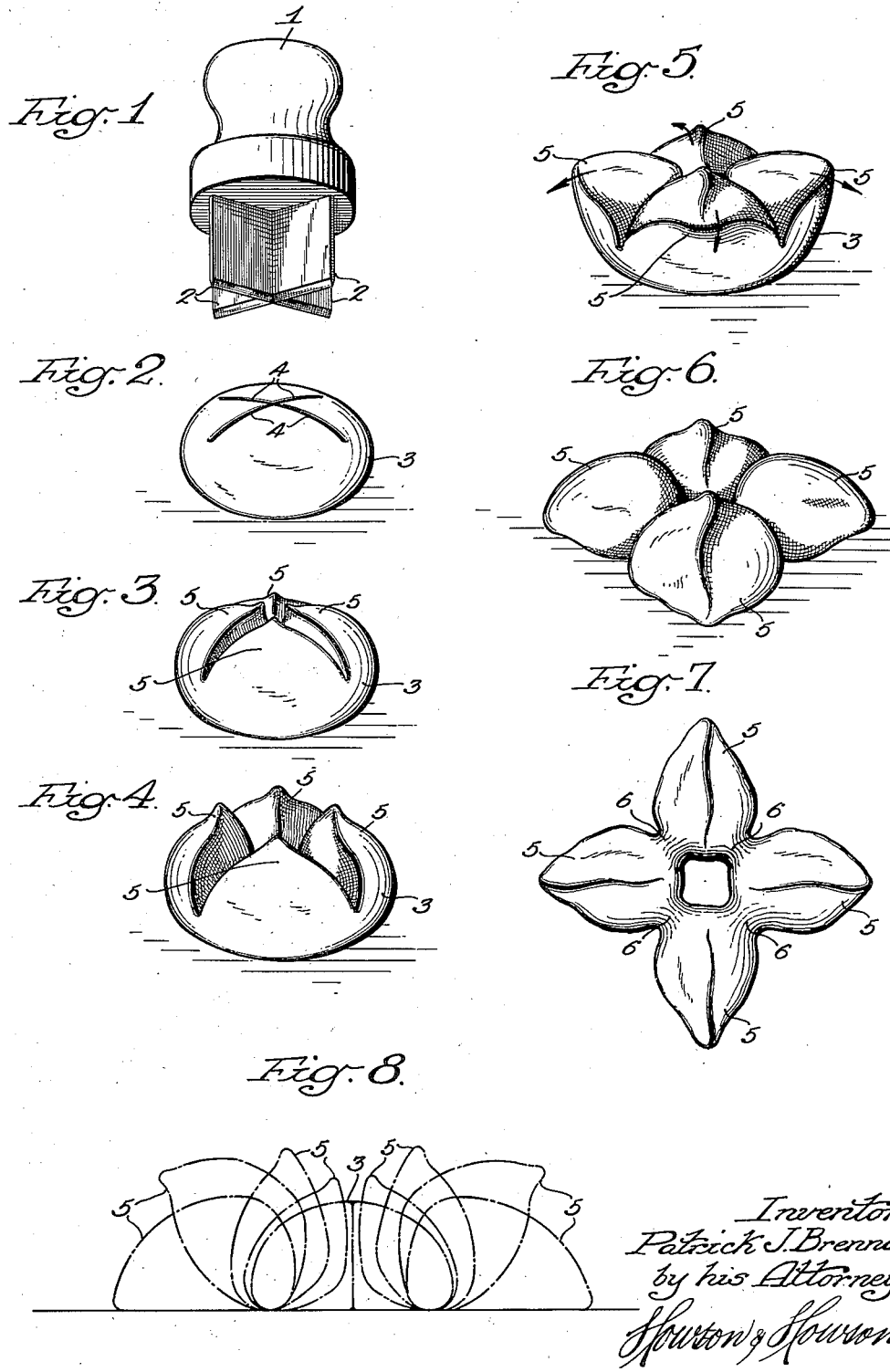

Patented Mar. 2, 1937

2,072,793

UNITED STATES PATENT OFFICE 2,072,793

METHOD OF FORMING ROLLS AND PASTRIES

Patrick J. Brennan, York, Pa., assignor of one-half to Edw. Fox Baking Co., Inc., York, Pa., a corporation of Pennsylvania Application November 21, 1935, Serial No. 50,977

4 Claims. (Cl. 107—54)

The object of this invention is to provide a novel and improved method for forming ornamental rolls and pastries.

The invention is illustrated in the attached drawing, in which:

Figure 1 is a view in perspective of a cutter of a type adapted to be used in the practice of my invention;

Figs. 2 to 6, inclusive, are views in perspective of the article of manufacture showing the latter in successive stages of development;

Fig. 7 is a plan view of the article as illustrated in Fig. 6, and

Fig. 8 is a diagrammatic sectional view illustrating the manner in which the article is formed.

With reference to the drawing, I may in the practice of my invention employ a cutter such as shown in Fig. 1. This cutter consists of a suitable handle 1 and a series of blades 2 which in the present case are four in number and project radially from a common center. In forming the roll or pastry, I may first form from the dough a ball 3, see Fig. 2, of a size suitable for the finished article. I then force the blades 2 of the cutter previously described downwardly through the ball of dough to form therein a series of incisions 4 extending radially from the center portion and completely through the ball from top to bottom, these incisions terminating at their outer ends within the dough mass. This divides the center portion of the ball of dough into a series of adjoining segments 5, each segment being connected to its adjoining segments by a relatively small section of uncut dough at the peripheral portion of the mass. Preparatory to making the incision, the blades of the cutter should have applied thereto a film of grease, this grease being transferred to the sides of the incision and preventing the severed surfaces of the dough from adhering to each other.

Following the incising of the dough as described, the individual segments 5 are turned about their juncture areas so that, as shown in Figs. 6 and 7, their original respective positions are reversed, thereby producing a flower-like formation having definite and distinctive ornamenal appearance, it being noted that the ornamental form is obtained without the waste that would attend the cutting of any similar formation by means of dies from a solid blank of dough.

When unfermented dough is used, the displacement of the segments 5 described above may be effected mechanically or by hand. I have discovered, however, that when fermented dough is employed, the said displacement of the segments can be effected automatically as a result of the "raising" or fermentation process. In the latter case, the cutting operation is performed prior to the fermentation of the dough, and the effect of the fermentation or raising of the dough is to cause the individual segments 5 to swing upwardly and outwardly around their juncture areas, designated by reference numeral 6, Fig. 7, as illustrated in Figs. 3 to 6, inclusive, thereby producing in the present instance a four-pointed flower-like formation having the distinctive ornamental form described. This process of formation is accomplished entirely automatically and as a result of the cutting of the dough mass as described and the subsequent raising operation. The progressive movements of the individual segments from their original to the final positions is clearly illustrated in Figs. 2 to 6, inclusive, and in the diagrammatic sectional view of Fig. 8, wherein the positions of the segments corresponding to their positions in Figs. 2 to 6, inclusive, have been indicated.

A desirable feature of this invention lies in the fact that the ornamental shape is obtained without the waste that would attend the cutting out of these shapes from a solid blank. The finished product is characterized not only by its desirable ornamental form but also by the fact that it comprises a series of readily separable and relatively small sections aiding the separation of the roll into readily handled small portions.

It will be understood that the invention is not limited to the production of articles of the particular form herein illustrated, and that it may be used in principle to produce a variety of different ornamental configurations.

I claim:

1. The method which comprises cutting a mass of dough to form a series of incisions extending substantially radially from the midsection of said mass to points short of the periphery and from top to bottom of the mass, displacing the segmental sections defined by said incisions from their respective normal to substantially reversed positions by pivotal movement about their juncture areas, and thereafter baking the dough to form the finished article.

2. The process of manufacture, which consists in incising a mass of dough from top to bottom to form therein a plurality of adjoining sections united at the peripheral portion of the mass, allowing said dough to ferment with a resultant change of form due to said incision, and thereafter baking the mass to form the finished article.

3. The method which comprises cutting a mass of dough to form a series of incisions extending substantially radially from the midsection of said mass to points short of the periphery and from top to bottom of the mass, permitting said mass to ferment whereby the segmental sections defined by said incisions are displaced from their normal positions in the mass by a pivotal movement about their juncture areas, and thereafter baking the dough to form the finished article.

4. The method which comprises forming a mass of dough into ball-like form, forming in said ball a plurality of incisions radiating from a common center and extending through the ball from top to bottom, permitting said dough to ferment whereby the segmental portions defined by said incisions are displaced from their normal positions by a pivotal movement about their juncture areas, and thereafter baking the dough to form the finished article.

PATRICK J. BRENNAN.